United States Patent Office 3,417,182
Patented Dec. 17, 1968

3,417,182
COMPOSITIONS AND TREATMENTS USING 6-METHYL - 16 - METHYLENE - 17α - HYDROXY-4,6-PREGNADIENE-3,20-DIONE 17-ACETATE
John C. Babcock and J. Allan Campbell, Kalamazoo, Mich., assignors to The Upjohn Company, Kalamazoo, Mich., a corporation of Delaware
No Drawing. Continuation-in-part of applications Ser. No. 852,981, Nov. 16, 1959, and Ser. No. 267,776, Mar. 25, 1963. This application June 17, 1964, Ser. No. 375,916
17 Claims. (Cl. 424—243)

ABSTRACT OF THE DISCLOSURE

Pharmaceutical preparations and processes utilizing 6-methyl-16-methylene - 17α-hydroxy - 4,6 - pregnadiene-3,20-dione 17-acetate as essential active ingredient. Effective amounts of this ingredient are utilized in pharmaceutical compositions and treatments for human and veterinary applications. Ingestible pre-mixes, suspensions, feed compositions, control of estrual periods, stimulation of growth, and the like, utilizing effective amounts of 6-methyl-16-methylene-17α - hydroxy - 4,6 - pregnadiene-3,20-dione 17-acetate as essential active ingredient.

---

This invention relates to pharmaceutical compositions and uses thereof and more particularly to steroid pharmaceutical compositions and to the use thereof in the treatment of mammals and birds.

The invention provides novel compositions comprising pharmaceutically acceptable carriers and as the essential active ingredient 6-methyl-16-methylene-17α-hydroxy-4,6-pregnadiene-3,20-dione 17-acetate, and methods of treatment therewith. The said essential active ingredient can be prepared according to the processes disclosed in copending United States patent applications Ser. No. 852,981, now Patent No. 3,359,287 and Ser. No. 267,776, filed Mar. 25, 1963 now abandoned, of which this application is a continuation in part.

The modes contemplated by the inventors of carrying out the invention include pharmaceutical compositions suited for oral administration, pharmaceutical compositions suited for injection, implantable pellets, and methods of systemic administration thereof.

The compositions suited for oral administration include solid and liquid compositions. The solid oral compositions can be in the form of tablets, scored and unscored, coated and uncoated; capsules, hard and soft; powders; granules; pills; and the like. Solid diluents and carriers suited for such compositions are selected from the group consisting of liquids, carbohydrates, proteins and mineral solids. The liquid oral compositions can be in the form of dispersions, suspensions, and syrups.

Tablets contain the essential active ingredient in the required amount with pharmaceutically acceptable diluents, excipients, binders, disintegrators and lubricants. The essential active ingredient is preferably mixed with a carbohydrate diluent, for example, starch and sucrose; a mineral solid, for example, terra alba (calcium sulfate) and dicalcium phosphate; or the like, to form a basic powder mixture. The said mixture can be granulated by wetting with a protein binder such as gelatin solution, a carbohydrate such as starch paste, syrup, and acacia mucilage; and screened. As an alternative to granulating, the mixture can be slugged and the slugs broken down into granules prior to formation of the tablets. A carbohydrate disintegrator, for example, corn starch is advantageously added at the time of forming the basic mixture. The lubricant, for example, a lipid such as stearic acid, a stearate salt and mineral oil; a mineral solid such as talc; and the like, is used to prevent sticking of the mixture to the tablet forming dies. The said tablets can be coated or uncoated. Suitable coatings include a sealing coat of shellac, a taste-disguising carbohydrate coating such as sugar and methyl cellulose, and a lipid polish coating of, for example, carnauba wax. The coating can comprise (a) lipid type coatings of a semi-permeable nature for delaying absorption of the essential active ingredient to provide sustained action, or (b) enteric substances such as styrene maleic acid copolymer and cellulose acetate phthalate to resist release of the essential active ingredient in the stomach and permit release in the upper intestine.

The capsules for oral use comprise the essential active ingredient in combination with a pharmaceutically acceptable diluent or excipient and a formed gelatin enclosure for the composition. The capsules can be in the form of soft capsules enclosing the active ingredient in the required amount with suitable diluents, for example, edible oils. The diluents for hard capsules comprise mineral solids, for example, talc, dicalcium phosphate, and the like; carbohydrates, for example, starch, sucrose and lactose; and as required lubricants, for example, stearate salts.

The powders can be advantageously and conveniently prepared by comminuting the essential active ingredient in the required amount and mixing with a pharmaceutically acceptable diluent; for example, an edible carbohydrate such as starch, advantageously including sweetening and flavoring agents, for example, sugar, saccharin, cyclamate or its salts; and flavoring oils.

For the treatment of domestic birds and animals and laboratory animals by oral administration the essential active ingredient is conveniently incorporated into animal and bird feed carriers to compound pre-mix and ready-mix type products. The feed carriers comprise in balanced amounts the essential dietary constituents, protein, fat, carbohydrate, minerals, and the like. Premixes, for extemporaneous addition to animal and bird rations, contain ingestible bulking agents and diluents which can be dietary constituents, and the essential active ingredient in a concentration suited for the addition of the said ingredient in amounts calculated on the weight of the animal or bird under treatment. The ready-mixed type is prepared by incorporating the essential active ingredient directly into the bulk ration.

As set forth above, the liquid oral compositions can be in the form of dispersions, suspensions, and syrups.

Dispersions can be prepared in glycerol, propylene glycol, liquid polyethylene glycols, and mixtures thereof, and in edible oils. Under ordinary conditions of storage and use, such preparations contain a preservative to prevent the growth of microorganisms. Likewise, sweetening, coloring, and flavoring agents can be added.

Suspensions are prepared in an aqueous vehicle containing diluents, flavors, and preservatives as required.

The syrups contain the essential active ingredient in the required amount in an aqueous medium containing a sweetening agent, for example, sugar, saccharin, or cyclamate salts. Colors, flavors and preservatives are added for convenient storage and use.

As stated above, the pharmaceutical compositions can be in forms suited for injection use, which forms include sterile aqueous suspensions and sterile powders for the extemporaneous preparation of sterile injectable suspensions. In all cases the form must be sterile and must be fluid to the extent that easy syringeability exists. It must be stable under the conditions of manufacture and storage and must be preserved against the contaminating action of microorganisms such as bacteria and fungi. The basic dispersion medium can contain water, ethanol, polyols (for example, glycerol, propylene glycol, and liquid polyethylene glycol, and the like), suitable mixtures thereof and vegetable oils. The proper fluidity can be maintained, for example, by the use of a coating such as lecithin, by the maintenance of the required particle size for suspenisons and by the use of surfactants (for example, a condensation product of ethylene oxide with fatty acids or fatty alcohols, partial esters of fatty acids and a hexitol anhydride, and polyoxyethylene condensation products of the esters). The deleterious action of microorganisms can be prevented by various antibacterial and antifungal agents, for example, parabens, chlorobutanol, benzyl alcohol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Generally, suspensions are prepared by incorporating the previously sterilized essential active ingredient into a sterile vehicle which contains the basic dispersion medium and the required other ingredients from those enumerated above.

The essential active ingredient can be sterilized by the use of a gas, for example, ethylene oxide. With the required additional ingredients and in the proper particle size, the sterilized ingredient can be compounded into a sterile powder for later extemporaneous reconstitution with a desired suspending liquid, which, of course, itself must be sterile.

It is especially advantageous to compound the inventive compositions in dosage unit form for ease of administration and uniformity of dosage. Dosage unit form as used in the specification and claims herein refers to physically discrete units suited as unitary dosages for animal, bird, and human subjects, each unit containing a predetermined quantity of active material calculated to produce the desired therapeutic effect in association with the required pharmaceutical carrier. The specifications for the novel dosage unit forms of this invention are dictated by and directly dependent on (a) the unique characteristics of the active material and the particular therapeutic effect to be achieved and (b) the limitations inherent in the art of compounding such an active material for therapeutic use in animal, bird, and human subjects as disclosed in detail in this specification, these being features of the present invention. Examples of the dosage unit forms heretofore described are premixes, boluses, tablets, capsules, pills, powder packets, wafers, cachets, teaspoonfuls, dropperfuls and tablespoonfuls, implantable pellets, vials, ampuls, and segregated multiples thereof, and other forms alluded to herein. Drop dosage forms are well suited for use in birds and poultry.

The inventive compositions are administered in varying dosages depending on the weight and condition of the mammals and birds under treatment, the route of administration, i.e., oral administration or parenteral injection, the particular condition to be treated and the nature of the desired results.

The total daily dosage of active ingredient per pound of the treated subject varies from about 0.05 μcg. to about 2 milligrams. Thus, over the weight range of about 5.5 pounds for a heavy breed hen to about 1000 pounds for a mare, the daily dosage ranges from about 0.3 microgram to about 2000 milligrams of the active ingredient.

The said dosages can be administered, for example, in the form of an ingestible pre-mix containing by weight from about 0.00001% to about 1% of the 6-methyl-16-methylene - 17α - hydroxy-4,6-pregnadiene-3,20-dione 17-acetate; in the form of a sterile injectable suspension containing by weight/volume from about 0.5% to about 25% of the 6-methyl-16-methylene-17α-hydroxy-4,6-pregnadiene-3,20-dione 17-acetate; in the form of an implantable pellet containing from about 0.5 mg. to about 250 milligrams of the 6-methyl-16-methylene-17α-hydroxy-4,6-pregnadiene-3,20-dione 17-acetate; in the form of an ingestible bolus containing from about 50 μcg. to about 100 milligrams of the 6-methyl-16-methylene-17α-hydroxy-4,6-pregnadiene-3,20-dione 17-acetate; in the form of an aqueous oral suspension containing by weight/volume from about 0.005% to about 5% of the 6-methyl-16-methylene-17α-hydroxy-4,6-pregnadiene-3,20-dione 17-acetate; in the form of an ingestible ready-mix feed composition containing by weight from about 0.000002% to about 0.008% of the 6-methyl-16-methylene-17α-hydroxy-4,6-pregnadiene-3,20-dione 17-acetate; and in the form of an oral tablet or capsule containing from about 10 μcg. to about 100 milligrams of the 6-methyl-16-methylene-17α-hydroxy-4,6-pregnadiene - 3,20 - dione 17-acetate.

The compositions of the present invention are novel and useful pharmaceutical preparations demonstrating unexpected, advantageous and beneficial results in the treatment of ovulating mammals and birds, for example, by re-establishing normal endometrium-ovary-anterior pituitary relationships, by forestalling habitual and threatened abortion, by easing pre-menstrual tension, by preventing ovulation, in treating endometriosis and dysmenorrhea, and in delaying menstruation. In the practice of veterinary medicine, the compositions provide beneficial and advantageous results in the hormonal control of the reproductive cycle in animals, for example, by reducing the post-partum anestrual period in cattle; by increasing in animals the number of implanted fertilized ova, of live births and the viability thereof; by synchronization of the estrual period in a group of swine, cattle, horses, sheep, dogs or cats; by preventing estrual activity in fattening meat animals; by initiating cyclic activity in normal but non-cycling animals; by controlling the estrual period in individual animals; by shortening pseudopregnancy in dogs; and by providing compositions and methods to further weight gain with lessened side effects in beef cattle. In birds, there are provided compositions and methods to interrupt broodiness in laying hens, to control the moulting period and the egg laying period of a flock, and to increase the number of eggs. The species variations in the estrual periods of the mammals must be taken into account in the several uses of the inventive compositions. When cycling, cows, horses, sheep, swine, and cats have normal estrual periods from about 15 to about 23 days apart; dogs about 6 months apart. Thus, the treatment to synchronize the estrual period, whether oral or injectable, is continued for a maximum number of days ascertainable by reference to the normal length of the estrual period of the particular species. Prolonged prevention of the estrual periods is brought about by continued oral treatment or spaced administration of injectable suspensions with a prolonged effect.

In ruminants such as cattle, sheep and goats the novel compositions are surprisingly effective. Oral rations comprising an effective amount of the essential active ingredient for growth stimulation and a major amount of an ingestible feed carrier for ruminants provide advantageously beneficial results by increasing weight gain in feed lot heifers. Similar compositions provide advantageously beneficial results by synchronizing estrual periods in a group of cattle or ewes; by maintaining pregnancy in repeat breeder heifers, cows and ewes; by allowing a breeder to fix the estrual period in an individual heifer or ewe, for example, a prize heifer or ewe; by corrective treatment of cyctic ovaries in heifers and cows; and by furthering mammary development and milk secretion in heifers or infertile cows in the absence of gestation. These oral rations comprise from about 0.000004% to about 0.0006% by weight of the essential active ingredient and a major amount of the ingestible feed carrier for ruminants which as aforesaid can be the usual dietary constituents of the ruminants. A feed lot heifer eating 15 to 25 lbs. per day of an oral composition containing preferably about 0.000004% by weight of the essential active ingredient, i.e. about 0.02 mg. per lb., receives a daily dosage of about 0.3 to about 0.5 mg. of said ingredient per day. An ewe eating 0.1 lb. per day of a ration comprising about 3 mg. of the active ingredient per lb. receives a daily dosage of about 0.3 mg. of said ingredient. By adjustment of the concentration of the essential active ingredient in feed supplements to the main diet the same dosage schedule can be maintained. The amount of such supplementary feed is usually 1 to 3 lbs. per day. A composition containing about 0.6 to 3 mg. per lb. provides a daily dosage of about 0.3 mg. per day to an ewe eating 0.1 to 0.5 lb. per day. Oral feeding of the inventive composition is preferred. However, administration of a bolus containing from about 0.1 to about 0.5 mg. of the essential active ingredient is satisfactory. Although such administration requires individual handling of the heifer or ewe, a breeder of a prize heifer or ewe may prefer administration by bolus over oral feeding in the diet.

The following examples include the best mode contemplated by the inventor of carrying out the invention and are not to be construed as limiting.

Example 1.—Injectable suspension 10,000 ml. of a sterile aqueous suspension are prepared from the following types and amounts of ingredients:

| Each ml. | | Total |
| --- | --- | --- |
| 2.5 mgs. | 6-methyl-16-methylene-17α-hydroxy-4,6-pregnadiene-3,20-dione 17-acetate. | 25 gm. |
| 9 mgs. | Sodium chloride | 90 gm. |
| Q.s. | Water for injection U.S.P. | ad 10,000 ml. |

The sodium chloride and a preservative are dissolved in the water and the whole is sterilized by passage through a sterilizing filter. The active ingredient is micronized, sterilized by exposure to sterilizing vapor and added aseptically to the sterile aqueous solution. Dispersion is accomplished by passing through a sterile homogenizer. The final suspension is filled aseptically into sterile vials.

The duration of action of the injected suspension is prolonged. The single injection of 4 ml. per animal in a group of beef cattle is effective in preventing estrus for from about 50 to about 100 days.

Example 2.—Oral suspension 4000 ml. of a fluid drop preparation suitable for the addition of measured amounts to animal feed is prepared from the following types and amounts of ingredients:

| | Gm. |
| --- | --- |
| Preservative | 14 |
| Surfactant | 3.6 |
| 6 - methyl - 16 - methylene-17α-hydroxy-4,6-pregnadiene-3,20-dione 17-acetate | 0.4 |
| Purified water U.S.P., q.s. ad 4000 ml. | |

The preservative is added to 500 ml. of the water at about 55° C. The surfactant is added followed by the micronized active ingredient. The whole is made up to volume with the balance of the water and passed through an homogenizer.

For control of the estrual period of a 10 kilo bitch, 2 ml. is added daily to the animal ration, providing a daily dosage of 200 μcg. of the steroid acetate equivalent to 20 μcg. per kilo of dog weight per day. After cessation of treatment the animal comes into heat and can be bread successfully.

For synchronization of the moulting period in poultry, 1 liter is mixed daily into 50 lbs. of feed mash for a flock of 100 heavy breed (5.5 lbs.) hen chickens, providing a daily dosage in one-half pound of the mash of 1 mg. of the steroid acetate equivalent to about 0.4 mg. per kilo of hen weight per day. After cessation of treatment the chickens begin to lay concurrently.

Example 3.—Ready-mix feed composition

A mash feed mix for hen chickens is prepared from the following types and amounts of materials:

| | |
| --- | --- |
| Laying mash | lbs__ 100 |
| 6-methyl-16-methylene-17α-hydroxy-4,6-pregnadiene-3,20-dione 17-acetate (micronized) | mgs__ 200 |

The active ingredient is micronized and worked into a portion of the mash by careful mixing, and the mix is incorporated uniformly into the remaining mash. Each pound of the finished preparation contains 2 mg. of the steroid acetate, providing a daily dose of 1 mg. for a heavy breed hen eating one-half pound of the mash per day. This daily dose is effective in controlling the moulting period.

Example 4.—Implantable composition 10,000 pellets for implantation in beef cattle are prepared from the following types and amounts of materials:

| | |
| --- | --- |
| 6-methyl-16-methylene-17α-hydroxy 4,6-pregnadiene-3,20-dione 17-acetate | gms__ 100 |

The active ingredients is blended with an inert diluent into a uniform mixture. The mixture is slugged and screened to a granular consistency. A lubricant is added and the granules are compressed into pellets, each containing 10 mgs. of the progestational compound.

Good results in the weight increase of growing beef cattle are obtained by implantation of one pellet at the time the cattle go on full feed for fattening.

Example 5.—Ingestible pre-mix 10,000 gms. of a pre-mix is prepared from the following types and amounts of ingredients:

| | |
| --- | --- |
| 6-methyl-16-methylene - 17α - hydroxy-4,6-pregnadiene-3,20 17-acetate | gm__ 1 |
| Soybean meal | gms__ 9999 |
| Chloroform, U.S.P. | mls__ 1500 |

A chloroform solution of the active ingredient is prepared and incorporated gradually and uniformly into the soybean meal. After adequate mixing the whole is dried to remove any trace of chloroform.

Each gram of the pre-mix contains 0.1 mg. of the steroid acetate. Two kilograms of the pre-mix is added to 1 ton of the standard ration of a group of gilts to provide 0.1 mg. per pound of feed which furnishes a daily dose to each gilt of 0.5 mg. of the steroid acetate when the animal is fed at the rate of 5 lbs. finished feed per day. Treatment throughout gestation results in an increased number of pigs at farrowing.

An equally satisfactory pre-mix is prepared by omitting the chloroform, grinding the active ingredients into a fine powder, which is added to the soybean meal with mixing, and using mineral oil as an antidust. This gives a uniform pre-mix which is well suited for later incorporation into the animal ration.

Example 6.—Bolus 9000 boluses, each containing 45 mgs. of the steroid acetate, are prepared from the following types and amounts of ingredients:

| | Gms. |
| --- | --- |
| 6-methyl-16-methylene-17α - hydroxy-4,6-pregnadiene-3,20 17-acetate | 405 |
| Lactose | 59,535 |

The above ingredients are blended and granulated with syrup-starch paste. The granulation is then dried, lubricated with starch, talc and calcium stearate powders, and compressed.

The oral administration to a cycling mare of four boluses per day is effective in the control of estrus. The treatment is especially advantageous in racing mares.

Example 7.—Tablet 10,000 compressed tablets are prepared from the following types and amounts of ingredients:

Each tablet, mgs.:
0.05 6 - methyl-16-methylene-17α-hydroxy-4,6-pregnadiene-3,20-dione 17-acetate ___mgs__ 500
150 lactose _____gms__ 1500
3 acacia _____gms__ 30
65 starch, bolted _____gms__ 650
3 calcium stearate _____gms__ 30

The first three ingredients are powdered and mixed well. The mixture is granulated with syrup-starch paste and dried. The dried granules are well mixed with a starch-calcium stearate lubricant mixture. The whole is compressed into tablets.

Good results are obtained in the prevention of the estrual period in smaller dogs weighing about 5 lbs., one tablet being administered daily.

Example 8.—Tablet 10,000 tablets for oral administration are prepared from the following types and amounts of ingredients. Each tablet contains 5 mgs. of the active ingredients.

Gms.
6-methyl-16-methylene - 17α - hydroxy 4,6-pregnadiene-3,20 dione 17-acetate _____ 50
Lactose _____ 2650

The finely powdered steroid and lactose are mixed well and granulated with syrup-starch paste. Starch and calcium stearate are used as lubricants in the compressing step.

The tablets are administered orally 3 times daily with good results in the treatment of habitual and threatened abortion in humans.

Similarly, tablets, each containing 2 mgs. of the steroid, are prepared for the administration of smaller dosages.

Example 9.—Multiple dose injectable suspension 10,000 mls. of a sterile aqueous suspension are prepared from the following types and amounts of ingredients:

| Each ml. | | |
|---|---|---|
| 10 mgs__ | 6-methyl-16-methylene-17α-hydroxy-4,6-pregnadiene-3,20-dione 17-acetate. | 100 gms. |
| 9 mgs___ | Sodium chloride | 90 gms. |
| 0.2 mg__ | Preservative | 2 gms. |
| Q.s_____ | Water for injection U.S.P | ad 10,000 mls. |

The sodium chloride and preservative are dissolved in the water and the whole is sterilized by passage through a sterilizing filter. The steroid is micronized, sterilized by exposure to sterilizing vapor and added aseptically to the sterile aqueous solution. Dispersion is accomplished by mixing through a sterile homogenizer. The final suspension is filled aseptically into sterile vials. The duration of action of the suspension is prolonged. Beneficial results in the treatment of endometriosis and recurrent abortion in humans are obtained by the injection of 1 ml. one to three times monthly. Inhibition of ovulation can be brought about by like dosages.

Example 10.—Oral suspension

An aqueous suspension for oral administration, containing in each teaspoonful (approximately 5 mls.) 2.5 mgs. of 6-methyl-16-methylene-17α-hydroxy-4,6-pregnadiene-3,20-dione 17-acetate, is prepared from the following types and amounts of ingredients:

Gms.
6-methyl-16-methylene-17α-hydroxy-4,6-pregnadiene-3,20-dione 17-acetate _____ 0.5
Preservative _____ 2
Flavor q.s.
Purified water U.S.P. q.s. ad 1000 mls.

The preservative and flavor are dissolved in the water. The finely powdered steroid is added and the whole is homogenized.

A daily dose of 1 teaspoonful (5 mls.) gives good results in the treatment of menstrual disorders in humans.

Example 11.—Hard gelatin capsule 1000 hard gelatin, two-piece capsules for oral administration, each containing 100 mgs. of 6-methyl-16-methylene-17α-hydroxy-4,6-pregnadiene-3,20-dione 17-acetate, are prepared from the following types and amounts of materials:

Gms.
6-methyl-16-methylene-17α-hydroxy-4,6-pregnadiene-3,20-dione 17-acetate _____ 100
Starch-lactose mixture q.s.

The powdered steroid and starch-lactose mixture are mixed and then encapsulated by the usual techniques in two-piece capsules.

A daily dose of 1 capsule gives good results in the control of the estrual period in a mare. After cessation of treatment, the mares can be bred successfully at approximately the same time.

Example 12.—Ready-mix feed composition

Ready-mixed feed is prepared in the following manner:

Commercial dog feed _____lbs_____ 100
6-methyl-16-methylene-17α-hydroxy-4,6-pregnadiene-3,20-dione 17-acetate _____mgs_____ 20

The steroid is worked into a portion of the feed by careful mixing and milling. This mix is incorporated uniformly into the remaining feed. Each pound of the finished preparation contains 0.2 mg. of the steroid providing a total daily dose of 0.25 mg. for a 10 kilo dog eating 1¼ lb. of the feed per day. This daily dose is effective in preventing estrus in the female dog.

Example 13.—Ingestible pre-mix

Following the procedure of Example 5, a pre-mix is prepared to provide 0.5 mg. of 6-methyl-16-methylene-17α-hydroxy-4,6-pregnadiene-3,20-dione 17-acetate per pound of ration.

Four groups of dairy heifers are used to study fertility after synchronization with varying daily feedings of rations containing the pre-mix at random stages of the estrual cycles. The results are as follows:

| Heifers | Total Daily Feeding | Ovulation Inhibition, Percent | Av. Days to 1st Estrus [1] | Conceptions Service | |
|---|---|---|---|---|---|
| | | | | 1st | 2nd |
| 10 | 2×2 lbs. (2 mgs.) | 100 | 6.25 | 4 | 5 |
| 10 | 1×2 lbs. (1 mg.) | 100 | 6.10 | 4 | 5 |
| 9 | 2×1 lb. (1 mg.) | 100 | 5.50 | 4 | 4 |
| 10 | 1×1 lb. (0.5 mg.) | 90 | 4.61 | 4 | 5 |

[1] From last feeding.

Individual feeding of dairy heifers of known reproductive history was studied also. Feeding began on the 15th day of the estrual cycle and continued through day 30. Twice daily observations for estrus and rectal palpation of the ovaries provided data on the effectiveness of the treatment.

Once daily feedings equivalent to 1, 2, 4, and 8 mgs. of the essential active ingredient inhibited ovulation. With feedings equivalent to 1 and 4 mgs. per day, the ranges for return to estrus were 5 to 7 and 7 to 9 days respectively.

Natural and synthetic estrogens, i.e., substances capable of inducing feminine characteristics, are useful supplementary active ingredients in the above examples for oral use, especially to maintain a normal balance between progestational and estrogenic activity and in the prevention of ovulation in humans. Such estrogens include estradiol, ethinyl estradiol, benzestrol, dienestrol, diethylstilbestrol, hexestrol, and the like. Per dose, the respective amounts thereof are 0.1 to 0.5 mg., 0.01 to 0.5 mg., 0.5 to 25 mgs., 0.1 to 10 mgs., 0.1 to 25 mgs., and 1 to 3 mgs.

Example 14.—Maintenance of pregnancy in heifers

Data were obtained on maintenance of pregnancy in dairy heifers after ovariectomy. A total of 44 heifers were treated by daily feeding with a ration containing an ingestible feed carrier and the essential active ingredient, 6-methyl-16-methylene-17α-hydroxy - 4,6 - pregnadiene-3,20-dione 17-acetate. Data on dosage and effectiveness in maintaining pregnancy are reproduced below.

GROUP A

| Heifers | Day of Ovariectomy | Day of Starting Feeding | Dosage of 1.0 mg. |
|---|---|---|---|
| 5 | 55th, 56th or 57th | 55th, 56th or 57th | 2 of 5 maintained for more than 20 days. 1 of 5 maintained for more than 150 days. |

GROUP B

| | | | Dosage of 0.2 to 0.4 mg. |
|---|---|---|---|
| 11 | 55th, 56th or 57th | 49th, 50th or 51st | 0 of 11 maintained for 20 days. |
| | | | Dosage of 1.0 mg. |
| 8 | do | do | 7 of 8 maintained for more than 20 days. 2 of 8 maintained for more than 150 days. |
| | | | Dosage of 4.0 mg. |
| 10 | do | do | 10 of 10 maintained for more than 20 days. 8 of 9 maintained for more than 150 days. |

GROUP C

| | | | Dosage of 4.0 mg. |
|---|---|---|---|
| 10 | 10th, 11th or 12th | Day 4 | 6 of 10 maintained for more than 20 days. 5 of 10 maintained for more than 150 days. |

These data show the effectiveness of the ration and method in maintaining pregnancy under the extreme condition of ovariectomy which removes natural support in maintenance.

Example 15.—Body weight gain in feedlot beef heifers 72 heifers, in 4 groups of 18 each, were fed regular grain rations containing various amounts of 6-methyl-16-methylene-17α-hydroxy-4,6-pregnadiene - 3,20 - dione 17-acetate as sole active ingredient per lb. of the grain to ascertain effects on body weight over a span of 111 days.

| Heifers | Amount of active ingredient per lb. of grain ration, mcg. | Daily consumption of grain ration, lbs. | Daily dosage of active ingredient, mg. | Average starting weight, lbs. | Average final weight, lbs. | Growth index, percent |
|---|---|---|---|---|---|---|
| 18 | 0 | 21.3 | 0 | 707 | 988 | 100 |
| 18 | 10 | 21.7 | 0.22 | 710 | 1,011 | 107 |
| 18 | 20 | 22.0 | 0.44 | 710 | 1,018 | 109 |
| 18 | 40 | 21.3 | 0.85 | 708 | 994 | 102 |

These data show that it is necessary to feed a ration supplying only an effective amount for growth stimulation. Amounts above the effective amount represent needless administration of the active ingredient.

What is claimed is:

1. An ingestible pre-mix for extemporaneous addition to animal and bird rations containing an ingestible bulking agent and as the essential active ingredient 6-methyl-16-methylene-17α-hydroxy-4,6-pregnadiene-3,20-dione 17-acetate, said ingredient being present in an amount of from about 0.00001% to about 1% by weight of the pre-mix.

2. A liquid suspension for administration by parenteral injection containing water for injection and as the essential active ingredient 6-methyl-16-methylene-17α-hydroxy-4,6-pregnadiene-3,20-dione 17-acetate, said ingredient being present in an amount of from about 0.5% to about 25% weight/volume of the suspension.

3. An implantable pellet containing a pharmaceutically-acceptable diluent and as the essential active ingredient 6 - methyl - 16 - methylene-17α-hydroxy-4,6-pregnadiene-3,20-dione 17-acetate, said ingredient being present in an amount of from about 0.5 milligram to about 250 milligrams per pellet.

4. An ingestible bolus containing an ingestible bulking agent and as the essential active ingredient 6-methyl-16-methylene - 17α - hydroxy-4,6-pregnadiene-3,20-dione 17-acetate, said ingredient being present in an amount of from about 50 micrograms to about 100 milligrams per bolus.

5. A ready-mix feed composition containing an ingestible diluent and as the essential active ingredient 6-methyl-16-methylene-17α-hydroxy-4,6-pregnadiene-3,20-dione 17-acetate, said ingredient being present in an amount of from about 0.000002 percent to about 0.008 percent by weight of the composition.

6. A solid pharmaceutical preparation comprising in unitary dosage form a pharmaceutically-acceptable carrier and as the essential active ingredient 6-methyl-16-methylene - 17α - hydroxy-4,6-pregnadiene-3,20-dione 17-acetate, said ingredient being present in an amount of from about 10 micrograms to about 100 milligrams per dosage form.

7. A method of forestalling habitual and threatened abortion in ovulating mammals which comprises systemic administration to threatened mammals of 6-methyl-16- methylene - 17α - hydroxy-4,6-pregnadiene-3,20-dione 17-acetate.

8. A method of reducing the postpartum anestrual period in ovulating cattle which comprises systemic administration thereto of 6-methyl-16-methylene-17α-hydroxy-4,6-pregnadiene-3,20-dione 17-acetate.

9. A method of synchronizing estrual periods in a group of ovulating animals which comprises systemic administration thereto of 6 - methyl-16-methylene-17α-hydroxy-4,6-pregnadiene-3,20-dione 17-acetate.

10. A method of controlling the moulting period and egg-laying period in laying hens which comprises systemic administration thereto of 6-methyl-16-methylene-17α-hydroxy-4,6-pregnadiene-3,20-dione 17-acetate.

11. A method of prolonged prevention of estrual periods in ovulating animals which comprises the oral administration thereto of 6-methyl-16-methylene-17α-hydroxy-4,6-pregnadiene-3,20-dione 17-acetate.

12. A method of prolonged prevention of estrual periods in ovulating animals which comprises the parenteral administration thereto of 6-methyl-16-methylene-17α-hydroxy-4,6-pregnadiene-3,20-dione 17-acetate.

13. A method of stimulating growth of ruminants, which comprises feeding ruminants rations supplying an effective amount of 6-methyl-16-methylene-17α-hydroxy-4,6-pregnadiene-3,20-dione 17-acetate for growth stimulation.

14. An oral ration effective in stimulating growth of ruminants comprising from about 0.000004% to about 0.0006% by weight of 6-methyl-16-methylene-17α-hydroxy-4,6-prednadiene-3,20-dione 17-acetate as essential active ingredient and a major amount of an ingestible feed carrier for ruminants.

15. A method of stimulating growth of ruminants which comprises feeding ruminants rations containing from about 0.000004% to about 0.0006% by weight of 6 - methyl - 16 - methylene-17α-hydroxy-4,6-prednadiene-3,20-dione 17-acetate as essential active ingredient and a major amount of an ingestible feed carrier for ruminants.

16. A method of maintaining pregnancy in cows, ewes and repeat breeder heifers which comprises feeding the pregnant animals rations containing from about 0.000004% to about 0.0006% by weight of 6-methyl-16-methylene - 17α - hydroxy - 4,6-pregnadiene-3,20-dione 17-acetate and a major amount of an ingestible feed carrier for said animals.

17. A method of furthering mammary development and milk secretion in heifers and infertile cows which comprises feeding said subjects rations supplying an effective amount of 6 - methyl - 16 - methylene-17α-hydroxy-4,6-pregnadiene-3,20-dione 17-acetate for furthering such development and secretion.

References Cited
UNITED STATES PATENTS 2,965,541   12/1960   Byrnes _____ 167—53.1

ALBERT T. MEYERS, *Primary Examiner.*

H. ELLIS, *Assistant Examiner.*

U.S. Cl. X.R.

167—53.1, 74